United States Patent Office 3,639,407
Patented Feb. 1, 1972

3,639,407
NOVEL 1,2,3,4,5,6-HEXAHYDRO-6-PHENYL-2,6-METHANO-3-BENZAZOCINES
Frank H. Clarke, Jr., Armonk, Fred B. Block, Hartsdale, and William G. Kofron, Dobbs Ferry, N.Y., assignors to Geigy Chemical Corporation, Greenburgh, N.Y.
No Drawing. Filed May 5, 1965, Ser. No. 453,491
Int. Cl. C07d 29/10, 29/16, 29/20
U.S. Cl. 260—293.54
8 Claims

ABSTRACT OF THE DISCLOSURE

This invention relates to novel organic compounds and to novel intermediates employed in their preparation. In particular, the present invention is directed to 1,2,3,4,5,6-hexahydro-6-phenyl-2,6-methano-3-benzazocines, a new class of compounds possessing unexpected and useful pharmacological properties.

The compounds embraced by the present invention may be represented by the following formula:

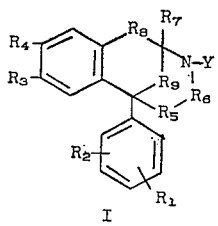

I in which
each of $R_1$ and $R_2$ is hydrogen, halogen, (lower)alkkyl, (lower)alkoxy, (lower)alkanoyloxy, hydroxy or trifluoromethyl;
each of $R_3$ and $R_4$, is hydrogen, hydroxy, halogen, (lower)alkoxy, or (lower)alkanoyloxy;
each of $R_5$, $R_8$ and $R_9$ is

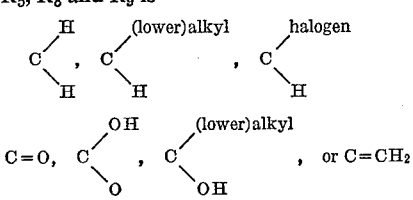

$R_6$ is

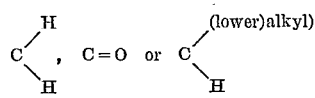

$R_7$ is hydrogen or (lower)alkyl, at least one of $R_5$, $R_6$ and $R_8$ being substituted with less than two hydrogen atoms or $R_7$ with less then one hydrogen atom in any particular compound in which $R_9$ is

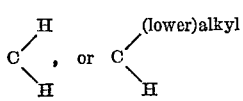

and
Y is hydrogen, (lower)alkynyl, Z-(lower)alkenylene or Z-(lower)alkylene wherein
Z is hydrogen, halogen, cycloalkyl, phenyl, halophenyl, nitrophenyl, hydroxyphenyl, aminophenyl, (lower)alkoxyphenyl, amino, alkylamino, dialkylamino, morpholino, hydroxy, (lower)alkoxy, (lower)alkanoyl or (lower)alkanoyloxy.

The benzazocine nucleus is numbered as follows in accordance with Chemical Abstracts, 50, 1512S (1956):

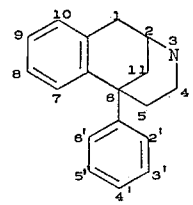

This numbering will be used hereinafter and in the appended claims. 2' is ortho; 3' is meta; and 4' is para.

Alternative numbering and nomenclature have become established and are used in the art. Mention is made of the use of the term 6,7-benzomorphan and of the following numbering (Merck Index, Seventh ed., p. 134 (1960):

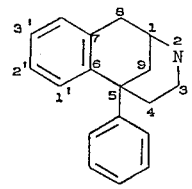

By the term "(lower)alkyl" and derivations thereof such as "(lower)alkoxy," "(lower)alkanoyloxy," "(lower)-alkenyl" and the like is intended a group comprising a branched or strtight hydrocarbon chain containing from one to six carbon atoms. Representative of (lower)alkyl groups are thus methyl, ethyl, propyl, i-propyl, butyl, s-butyl, t-butyl, pentyl, isopentyl, hexyl and the like. Embraced by (lower)alkoxy are groups containing from one to six carbon atoms and joined through an oxygen ether bond such as methoxy, ethoxy, i-propoxy, butoxy and the like. It is to be understood that when the nature of any particular functional group in these moieties, such as an olefinic bond in an alkenyl group, requires two carbon atoms, the hydrocarbon portion of the moiety will have from two to seven carbon atoms. Thus "(lower)alkanoyloxy" is typified by acetoxy, propanoyloxy, butanoyloxy, pentanoyloxy, hexanoyloxy and the like, while representatives of the term "(lower)alkenyl" include vinyl, allyl, 2-methyl-2-butenyl, isopropenyl, 1,3-butadienyl, 2-pentenyl and the like.

With greater particularity to Formula I, the phenyl group in the 6 position of the fundamental benzazocine may be unsubstituted, e.g., $R_1$ and $R_2$ are both hydrogen; monosubstituted, e.g., one of $R_1$ and $R_2$ is hydrogen and the other is a group other than hydrogen; or disubstituted, e.g., both $R_1$ and $R_2$ are groups other than hydrogen. $R_1$ and $R_2$ may be but are not necessarily the same.

Similarly the groups designated by $R_3$ and $R_4$ in the benzo moiety of the fundamental benzazocine nucleus may be the same or different groups. While both may be hydrogen, the preferred embodiment is characterized by $R_3$ being hydroxy or a derivative thereof, e.g., alkoxy or alkanoyloxy, and $R_4$ being hydrogen. Other combinations however, falling within the scope of Formula I are also contemplated.

The centers designated $R_5$, $R_8$ and $R_9$ may be substituted with hydrogen, (lower)alkyl, preferably methyl, although any alkyl group of from one to six carbon atoms as described above is embraced, halogen, such as chlorine, bromine, iodine or fluorine, ketonic oxygen, methylene, hydroxyl or mixed substituents, such as methyl and hydroxy, and the like.

The center designated $R_6$ can be substituted with hydrogen or (lower)alkyl as defined above, or ketonic oxygen.

The center designated $R_7$ may be substituted with hydrogen or (lower)alkyl as defined above.

The group Y may be hydrogen or a substitutent of an essentially hydrocarbon nature. For example, Y may be (lower)alkyl; (lower)alkenyl, such as vinyl, allyl, 2-propenyl, 2-isopentenyl and the like; or (lower)alkynyl, such as ethynyl, propynyl and the like. In addition, Y may be a substituted (lower)alkyl group in which one hydrogen atom of the alkyl group is replaced by a substituent such as cycloalkyl of from three to six carbon atoms, as for example, cyclopropyl; phenyl including substituted phenyl such as chlorophenyl, iodophenyl, bromophenyl, nitrophenyl, aminophenyl, (lower)alkoxyphenyl and the like; amino including mono and dialkylamino and cycloalkylamino groups; hydroxy, (lower)alkoxy or (lower)alkanoyloxy. Examples of these substituted (lower)alkyl groups are thus cyclopropylmethyl, phenethyl, 3,4-dichlorobenzyl, 4-aminophenethyl, methylaminopropyl, 2-piperidinylethyl, 2-ethoxyethyl, 2-hydroxyethyl, 2-acetoxyethyl and the like. Also encompassed within the scope of Y are substituted (lower)alkenyl such as halo(lower)alkenyl, e.g., 3-chloroallyl. Thus Y may be defined as being hydrogen, alkenyl, halo(lower)alkenyl, (lower)alkynyl or Z-alkylene wherein Z is hydrogen, cycloalkyl, phenyl, halophenyl, nitrophenyl, aminophenyl, (lower)alkoxyphenyl, amino, alkylamino, dialkylamino, (lower)alkoxy or (lower)alkanoyloxy.

The compounds of this invention are non-toxic analgesics having an activity of the same order of magnitude as morphine. Many of these compounds are surprisingly free of addictive properties in contrast to morphine. Certain of the 6-phenyl-3-benzazocines of this invention are also valuable antitussive agents. Several are also antagonists of morphine. Some are stimulants; some are depressants.

These compounds may be administered parenterally or orally in any of the usual pharmaceutical forms including tablets, capsules, powders, suspensions, solutions, syrups and the like. Particularly valuable formulations include sustained release preparations which may be compounded by any of the known procedures.

Since the compounds of the instant invention possess an amino group, various obvious derivatives may be made without departing from the spirit of the present invention. For example, various quaternary salts such as the methiodide may be prepared. So too, the N-oxides of the instant compounds demonstrate important properties.

A particularly valuable embodiment of the present invention includes the acid addition salts prepared from pharmaceutically acceptable non-toxic acids. Such pharmaceutically acceptable non-toxic acid addition salts include those derived from organic and inorganic acids such as, without limitation, hydrochloric, hydrobromic, sulfuric, phosphoric, methanesulfonic, acetic, lactic, succinic, maleic, aconitic, phthalic, tartaric and like acids.

The compounds of the present invention may be prepared by a variety of processes to be illustrated and exemplified hereinafter.

One especially valuable process comprises reducing a keto-3-benzazocine according to the following scheme:

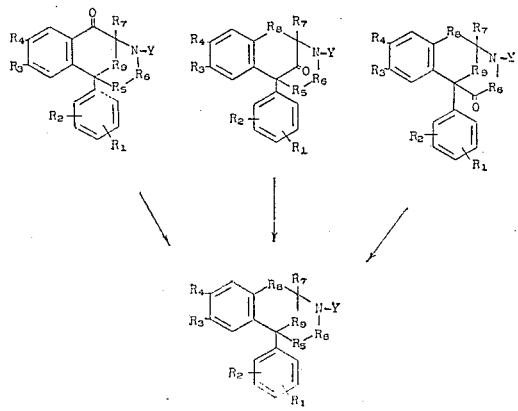

wherein $R_1$ through $R_9$ are as defined hereinbefore.

This process readily is carried out by treating the ketone with hydrazine and base under the conditions of the Wolff-Kishner Reduction or any of its known modifications. Of course, as is obvious to those skilled in the art, if more than one of the centers designated $R_5$, $R_7$, $R_8$ and $R_9$ bear ketonic oxygen, all will be reduced. Methods for preparing the ketones will be exemplified in detail hereinafter.

The conditions for carrying out the reduction are not particularly critical. It is sufficient to heat the ketone with at least an equimolar amount of hydrazine hydrate in the presence of a base, such as potassium hydroxide, and preferably in a high boiling inert solvent, such as diethylene glycol, until reduction is substantially complete and then to recover the product. The product can be purified by recrystallization and, if desired, it can be converted to its acid-addition salts, as will be exemplified hereinafter.

Special mention is made of the application of this process in the preparation of 3,5 - dimethyl-1,2,3,4,5,6-hexahydro - 6 - phenyl - 2,6 - methano-3-benzazocine (V) from its 1-keto derivative (IV) by he following sequence:

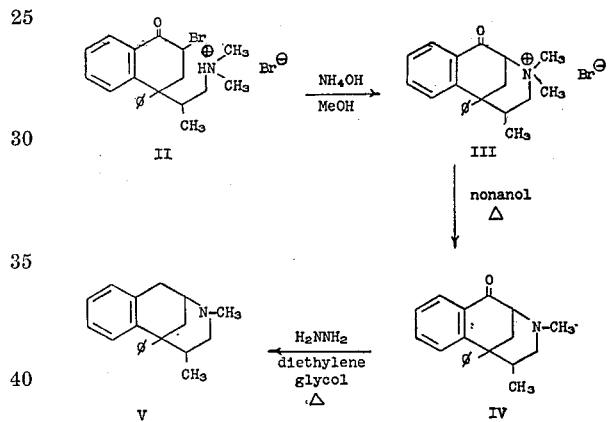

wherein φ represents a phenyl ring. It is to be understood that this process and those outlined hereinafter showing unsubstituted aromatic rings are broadly applicable to compounds containing the substituents designated $R_1$, $R_2$, $R_3$ and $R_4$ hereinabove. Convenient reaction conditions will be described in connection with the 3,4-dimethyl compounds.

The instant 3,4-dimethyl - 1,2,3,4,5,6 - hexahydro-6-phenyl-2-methano-3-benzazocine (IX) and its 1-keto derivative (VIII) are prepared by the following illustrative sequence:

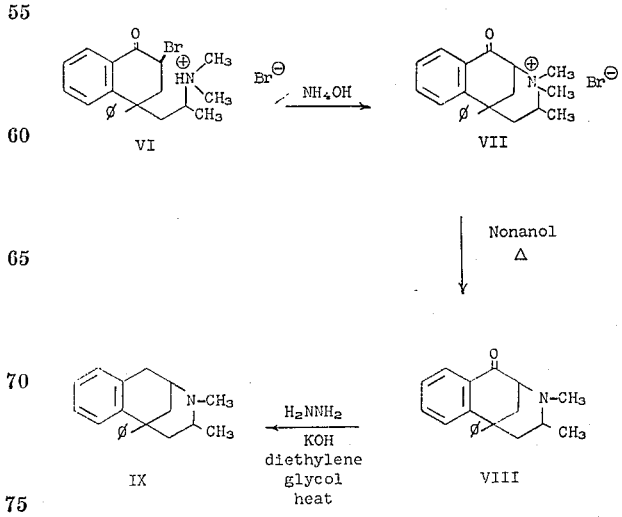

The useful intermediate VI is prepared by adding bromine in acetic acid to a solution of 4-β-dimethylaminopropyl-4-phenyl-1-tetralone, which in turn is prepared by alkylating 4-phenyl-1-tetralone with 2-dimethylaminopropyl-chloride hydrochloride. Intermediate VI is converted to 3,4-dimethyl - 1,2,3,4,5,6 - hexahydro-6-phenyl-2,6-methano-3-benzazocine-1- methobromide (VII) by treatment with methanol and ammonium hydroxide. Intermediate VII is converted to the instant 3,4-dimethyl-1,2,3,4,5,6-hexahydro-6-phenyl - 2,6 - methano-benzazocine-1-one (VIII) by refluxing it in a high boiling inert solvent, such as nonanol. The recovered ketone, when suspended in diethylene glycol in the presence of powdered potassium hydroxide and hydrazine hydrate, and heated at 180–185° for 3 hours leads to the desired 3,4-dimethyl-1,2,3,4,5,6-hexahydro-6-phenyl-2,6-methano - 3 - benzazocine (IX).

The new 2,3-dimethyl-1,2,3,4,5,6-hexahydro-6-phenyl-2,6-methanol-3-benzazocine (XIII) and its 1-keto derivative are prepared by the following sequence:

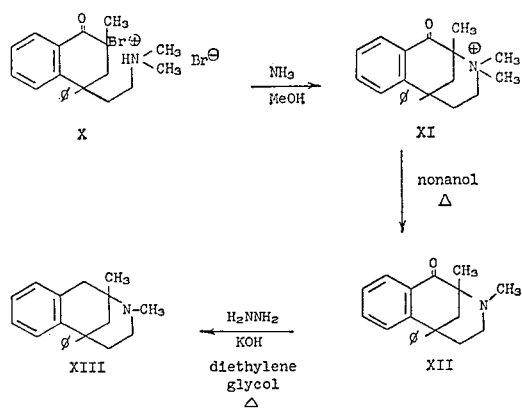

Conveniently, the reactions are carried out as outlined for the corresponding 3,4 - dimethyl compounds above.

The instant 1,2,3,4,5,6-hexahydro - 1 - keto-6-phenyl-2,6-methano-3-benzazocine (XVI) and the new 1-methyl-1-hydroxy derivative thereof (XVII) as well as the 1-methylene derivative (XVIII) and the valuable new 1,3-dimethyl-1,2,3,4,5,6-hexahydro - 6 - phenyl-2,6-methano-3-benzazocine (XIX) can be prepared as follows:

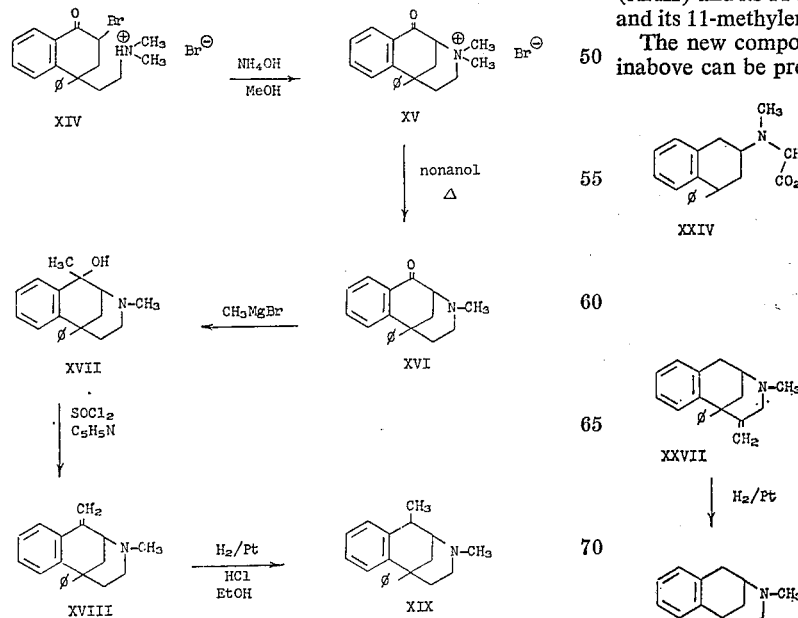

The higher alkyl hydroxy compounds of the present invention are obtained if a compound of Formula XVI or an appropriate analog (such as XII, XIII, IV and the like) is treated with a Grignard reagent of the formula (lower)alkyl—Mg—X wherein (lower)alkyl is as designated above and X is chlorine or bromine, preferably bromine.

Alternatively, a (lower)alkyl lithium reagent may be used to convert the keto-center in compounds such as XVI, XII, VIII, IV and the like to one substituted with a hydroxyl group and a lower alkyl group. This can be dehydrated with thionyl chloride and pyridine to give a center substituted with an alkylene group. The alkylene group can be reduced to an alkyl group as described hereinafter.

The first two steps in the sequence are conveniently carried out by the procedures outlined for the corresponding 3,4-dimethyl compounds.

The new compounds in which $R_9$ is designated hereinabove can be prepared by the following sequence:

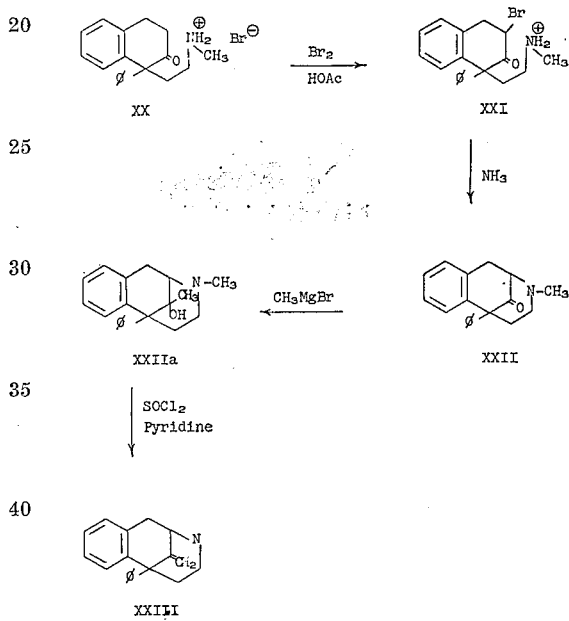

This sequence provides the valuable new 1,2,3,4,5,6-hexahydro-11-keto-6-phenyl-2,6-methano-3 - benzazocine (XXII) and its 11-methyl, 11-hydroxy derivative (XXIIa); and its 11-methylene derivative XXIII).

The new compounds in which $R_5$ is as designated hereinabove can be prepared by the following sequence:

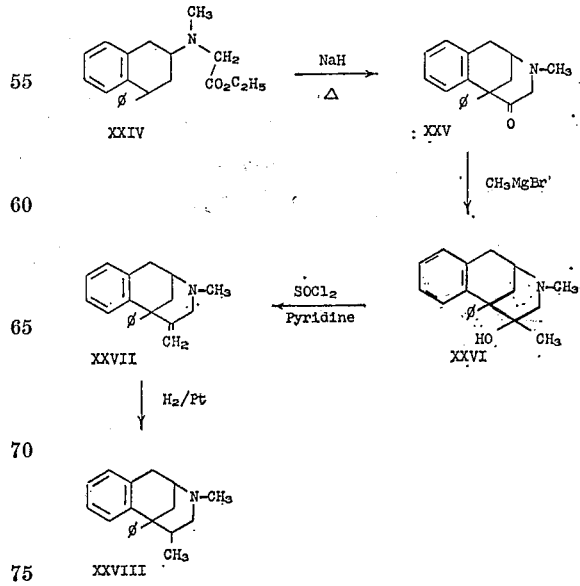

This sequence provides the valuable new 1,2,3,4,5,6-hexahydro - 6 - phenyl - 2,6 - methano - 3 - benzazocine-5-one (XXV), its 5-methyl,5-hydroxy derivative (XXVI), its 5-methylene derivative (XXVII) and its 5-methyl derivative. The instant compounds in which $R_5$ is (lower) alkyl can be readily obtained using an appropriately substituted 5-keto compound and a (lower)alkyl Grignard reagent.

The instant compounds in which $R_6$ is keto can readily be prepared by the following sequence:

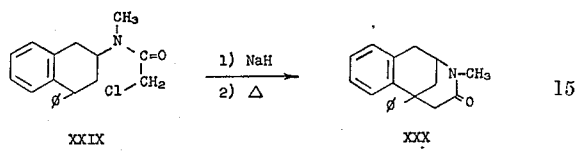

If an appropriately substituted starting material is used, analogs of 1,2,3,4,5,6 - hexahydro - 4 - keto - 6 - phenyl-2,6-methano-3-benzazocine (XXX) are obtained and these can be reduced with lithium aluminum hydride and the like to the instant compounds wherein $R_6$ is

The instant compound in which both $R_6$ and $R_8$ are keto-substituted are readily obtained according to the following sequence:

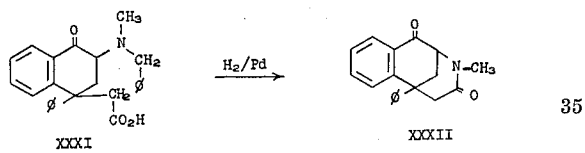

1,4 - diketo - 1,2,3,4,5,6 - hexahydro -6 - phenyl - 2,6-methano - 3 - benzazocine (XXXII) can be selectively reduced with hydrogen in the presence of palladium, in acid media, to form the 4-keto derivative (XXX) and its analogs.

The instant compounds in which $R_5$, $R_8$ and $R_9$ are either

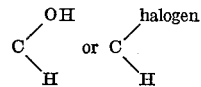

are readily prepared from the corresponding keto compounds, for example, IV, VIII, XII, XVI, XXII, XXV, XXX, XXXII and analogs thereof. Treatment of the keto compounds with sodium borohydride provides the corresponding hydroxy compounds. Treatment of the hydroxy compounds with a reagent capable of replacing the hydroxyl group with halogen provides the chloro-, bromo-, iodo- and fluoro-derivatives of the new keto compounds mentioned above.

The instant 5,11 - di - (lower)alkyl - 1,2,3,4,5,6-hexahydro - 6 - phenyl - 3 - methyl - 2,6 - methano - 3 - benzazocines of the instant invention are readily prepared by cyclization of a compound of the formula

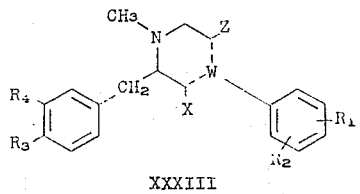

through the action of a Lewis acid. In Formula XXXIII, $R_1$, $R_2$, $R_3$ and $R_4$ are as above defined while W is a carbon-hydrogen arrangement capable of forming a carbonium ion on the carbon atom para to the nitrogen atom. X and Z are hydrogen or (lower)alkyl. Representative of such arrangements are those of the following formula:

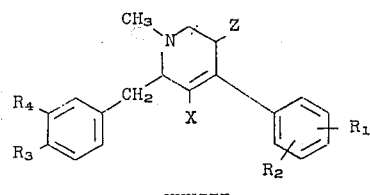

XXXIIIa

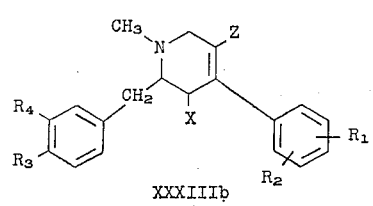

XXXIIIb

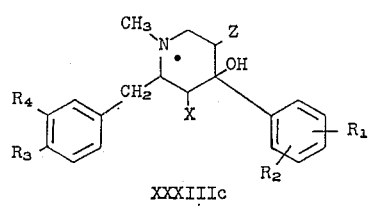

XXXIIIc

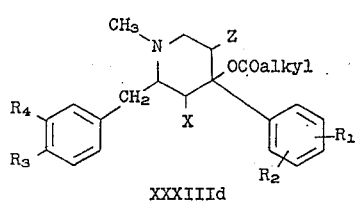

XXXIIId

Compounds of Formula XXXIIIa are the preferred starting reagent for this cyclization.

Lewis acids which are employed in the ring closure of compounds of Formula XXXIII include for example mineral acids such as phosphoric acid, sulfuric acid, hydrohalic acids, e.g. hydrobromic acid, as well as aluminum bromide, aluminum chloride, zinc chloride, titanium chloride, iron chloride, boron trifluoride and the like.

The reaction is generally executed at elevated temperatures such as at the reflux temperature of the reaction mixture. Generally an excess of the mineral acid is utilized when this is the cyclization reagent. In the case of aluminum chloride, aluminum bromide and similar Lewis acids, an inert solvent such as carbon disulfide is advantageously utilized.

In Formula XXXIII it is to be noted that while $R_1$, $R_2$, $R_3$ and $R_4$ are as defined as above, in certain instances side reactions may occur. Thus when any of $R_1$, $R_2$, $R_3$ and $R_4$ is alkoxy or alkanoyloxy and hydrobromic acid is employed, hydrolysis will most often occur during the cyclization so as to convert such a group to hydroxy. Similarly alkanoyloxy groups will be converted to a hydroxy group when phosphoric acid is employed in the cyclization step. Since however, the presence of hydroxy groups may result in the undesired precipitation of phenolic salts in preceding steps, it is generally preferable when a hydroxy group is desired to take advantage of this hydrolysis of alkoxy groups which occurs in the cyclization step by employing the corresponding alkoxy compound in preceding reactions. Such a hydroxy group may however be re-etherified or re-esterified, as the case may be, subsequent to the cyclization if an alkoxy or alkanoyloxy group respectively is desired. Generally the conversion of such a hydroxy group to an alkoxy group is accomplished by the action of diazoalkanes such as diazomethane. Alternatively phenyltrialkyl ammonium halides such as phenyltrimethyl ammonium chloride in the presence of sodium in an absolute alkanol can be used. The conversion of a hydroxy group to an alkanoyloxy group is preferably accomplished through the action of a reactive derivative of the alkanoic acid involved. Such reactive derivatives include for example anhydrides and acid halides.

The use of a Lewis acid such as aluminum bromide, aluminum chloride and the like in the cyclization step in certain instances offers advantages over the use of a Lewis acid of the mineral acid type. Thus the use of aluminum bromide or aluminum chloride results in the predominant production of one 3-benzazocine isomer over the other. In addition, the use of either of these reagents with hydrochloride salt of the tetrahydropyridine starting material permits maintenance of any alkoxy groups consisting of one or more of $R_1$, $R_2$, $R_3$ or $R_4$ whereas with the corresponding hydrobromide salt, cleavage of any such alkoxy group to a hydroxy group usually results, as discussed above.

While Formula XXXIII exhibits a methyl group attached to the nitrogen of the tetrahydropyridine ring, other inert groups embraced by the definition of Y may alternatively be employed. For example, in place of the methyl group in Formula XXXIII there may be another (lower)alkyl group, such as ethyl, or a phenyl(lower) alkyl group, such as phenethyl. When such a group on the nitrogen atom is the same as the Y group in the desired final compound of Formula I, no further reactions are necessary after cyclization. If a different Y group such as alkenyl, alkynyl, alkoxyalkyl or the like is desired, the employment of additional steps is preferred for the maximization of yield and purity. In such instances, the cyclization is preferably effected with an N-methyl compound (such as shown by Formula XXXIII) or other N-alkyl compounds in view of the protection afforded by such groups and their ease of removal subsequent to formation. Thus a 3-benzazocine of Formula I wherein Y is methyl (Formula XXXV) can be converted by one of several routes to 3-benzazocine derivatives where Y is some other group. For example, the conversion of 3-benzazocines of Formula XXXV to the corresponding N-desmethyl compound is accomplished by treatment with a slight molar excess of cyanogen bromide to form the corresponding cyano-3-benzazocine (XXXVI) which upon reduction with lithium aluminum hydride yields the desired N-desmethyl compound (XXXVII).

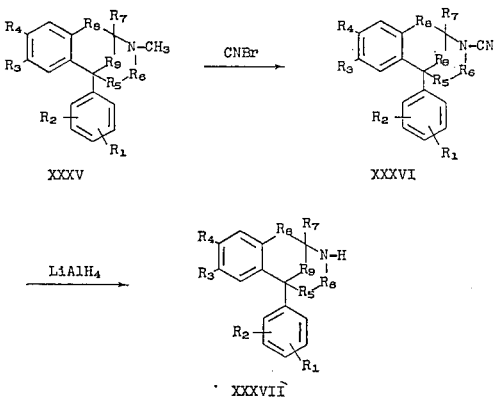

In place of lithium aluminum hydride, a strong mineral acid may be used in converting a compound of Formula XXXVI to a compound of Formula XXXVII.

Alternatively, in some instances, N-substituted derivatives may be directly prepared from the N-methyl compound of Formula XXXV. Thus by treatment with β-phenethyliodide there is formed a quaternary salt which upon treatment with lithium aluminum hydride yields the corresponding N-(β-phenethyl) compound.

Compounds of Formula XXXVII above are particularly valuable since by application of various procedures, it is possible to introduce a wide variety of substituents onto the nitrogen atom of the 3-benzazocine nucleus. For example, treatment of a compound of Formula XXXVII with an alkenyl chloride, alkynyl chloride, or phenethyl bromide yields the corresponding compound of Formula I wherein Y is alkenyl, alkynyl of phenethyl respectively. Thus as a variation of the present invention, compounds of Formula I wherein Y is a group other than hydrogen are prepared by treating a compound of Formula XXXVII with a compound of the formula:

Y′—Hal where Hal is a halogen atom, preferably chloro or bromo, and Y′ has the meaning given above for Y with the exception of hydrogen in the presence of an acid binding agent such as an alkali bicarbonate, in a solvent such as dimethylformamide at elevated temperatures, e.g. at reflux temperatures.

Alternatively substituted alkyl groups may be introduced through use of an acyl reagent with subsequent reduction of the amide thus formed. For example, treatment of a compound of Formula XXXVII with p-chlorophenylacetyl chloride to produce the N-(p-chlorophenylacetyl) compound followed by reduction yields a 3-benzazocine of Formula I wherein Y is β-p-chlorophenethyl. So too, by acylation of a N-desmethyl compound of Formula XXXVII with cyclopropane carboxylic acid chloride and subsequent reduction of the resultant cyclopropyl amide, there is obtained a compound of Formula I wherein Y is cyclopropylmethyl.

Notwithstanding the availability of the above synthetic routes for introducing various Y groups, it is possible through the careful selection of conditions to directly cyclize compounds of the formula:

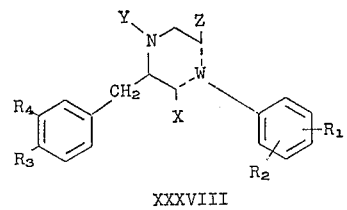

wherein X, Y, Z, $R_1$, $R_2$, $R_3$, $R_4$ and W are as above defined.

Compounds of Formula XXXVIII in addition to being useful as intermediates are useful per se as analgesics.

In addition, compounds of Formula XXXVIII in which Y is hydrogen may be cyclized according to the process of the present invention to yield the valuable intermediates of Formula XXXVII, which can be substituted in nitrogen atom position directly after cyclization without the need for an additional N-dealkylation step.

The compounds of Formula XXXVIII which are preferred for cyclization are those of the structure:

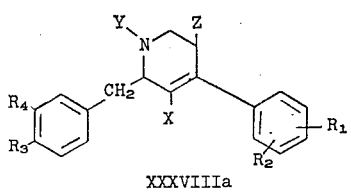

in which $R_1$, $R_2$, $R_3$, $R_4$, X, Y and Z are as above defined.

The requisite starting materials of Formula XXXVIII may be prepared by treatment of a substituted tetrahydropyridine of Formula XXXIX with a benzyl halide, preferably a benzyl chloride, of Formula XL to give the quaternary salt of Formula XLI. Upon treatment with strong base, such as sodium hydroxide, potassium hydroxide, or sodium or potassium amide this rearranges to yield a compound of Formula XXXVIIIa.

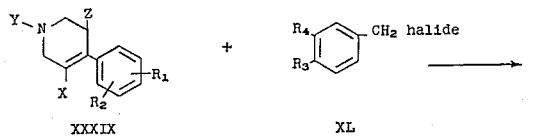

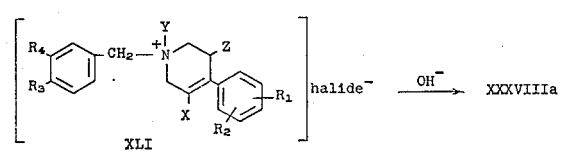

In this and the following synthetic route $R_1$, $R_2$, $R_3$ and $R_4$ may be any of the specified groups but preferably not hydroxy. When a hydroxy group is desired in the final compound of Formula I, it is advantageous to utilize the corresponding alkoxy derivative, as described above. So too, it is desirable to employ compounds in which Y is hydrogen, phenylalkyl or alkyl, preferably methyl. The use of other groups such as alkynyl or alkenyl generally is not advantageous in terms of purity and yield in these intermediate reactions. In addition, when Y is a group other than hydrogen, phenylalkyl or alkyl, there may be introduced the requirement for additional conversions since the subsequent cyclization is preferably executed with compounds in which Y is hydrogen, phenylalkyl or alkyl.

The compounds of Formula XXXVIII, notably those of Formula XXXVIIIa, may be alternatively prepared by treatment of the pyridinium compound of Formula XLII with a Grignard reagent such as shown by Formula XLIII. The resultant dihydropyridine compound of Formula XLIV is then selectively hydrogenated as by the use of sodium borohydride to yield the desired intermediate.

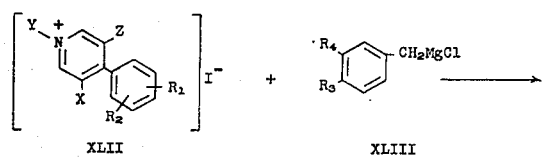

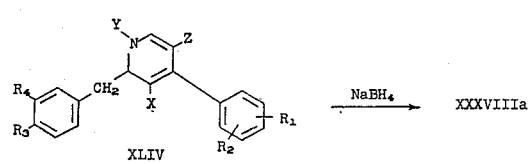

Compounds of Formula XXXIX may be prepared by treatment of a piperidone of Formula XLV with a phenyl lithium compound (XLVI) or a phenyl magnesium halide (XLVII). The resultant product XLVIII in either case is dehydrated by standard methods to yield the requisite intermediate.

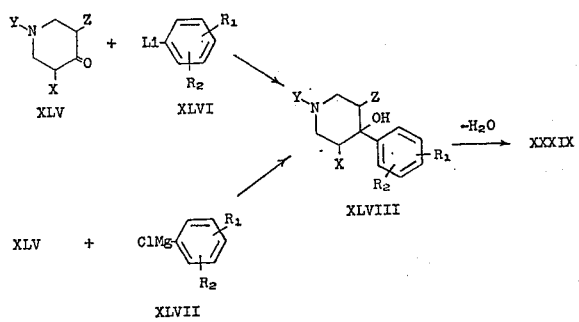

Alternatively, and conveniently, an isopropylbenzene of Formula XLIX may be condensed with an amine and formaldehyde to yield XLVIII which is dehydrated as in the above case.

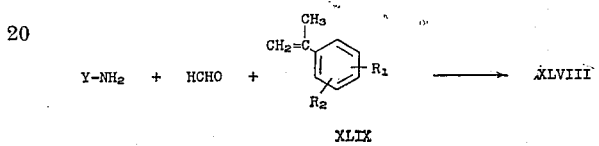

Compounds of Formula XLII may be prepared by dehydrogenation of compounds of Formula XXXIX, as with palladium-on-charcoal, followed by formation of the quaternary salt.

As can be seen from Formula I, the compounds of the present invention may exist in at least two optical isomers. Thus the presence of an "asymmetric" carbon atom in the benzazocine ring will result in the existence of d- and l-optical isomers. In addition, when $R_5$, $R_6$, $R_7$, $R_8$ or $R_9$ in Formula I are substituted with alkyl, halogen or hydroxyl groups, stereoisomers are possible, the said groups being cis or trans to the phenyl group in position 6. Still further isomeric forms will exist if the group represented by Y lacks a plane of symmetry. In each of these instances however, the geometric or stereoisomers may be separated by taking advantage of differences in their properties, e.g., by fractional crystallization or distillation. When it is desirable to resolve enantiomorphs, the standard formation of diastereoisomeric salts by the use of an optically active acid is employed. All such isomeric forms are within the purview of the present invention (including the d- and l-forms of each of the stereoisomers).

The following examples, presented for purposes of illustration and not limitation, will further serve to typify the nature of this invention.

EXAMPLE I 1,2,3,4,5,6-hexahydro-6-phenyl-3,5,11-trimethyl-2,6-methano-3-benzazocine-8-ol (a) 1,3,5-TRIMETHYL-4-PHENYL-1,2,5,6-TETRAHYDROPYRIDINE To a solution of 0.1 mole of phenyl lithium in ether at 0–5° is added 0.09 mole of 1,3,5-trimethyl-4-piperidone in 100 ml. of ether. The mixture is stirred for an hour at room temperature then quenched with 200 ml. of concentrated hydrochloric acid. The acid phase is refluxed three hours, made basic with 50% sodium hydroxide and extracted with ether. Concentration of the extract yields 1,3,5-trimethyl-4-phenyl - 1,2,5,6 - tetrahydropyridine.

(b) 1,3,5-TRIMETHYL-1-(4-METHOXYBENZYL)-4-PHENYL-1,2,5,6-TETRAHYDROPYRIDINIUM CHLORIDE

Ninety grams (.58 mole) of p-methoxybenzyl chloride in 50 ml. of acetone are added in a dropwise fashion to a stirred solution of .45 mole of 1,3,5-trimethyl-4-phenyl-1,2,5,6-tetrahydropyridine in 350 ml. of acetone at reflux. The mixture is heated at reflux with stirring for two hours, at the end of which time the solid which has formed is collected from the cooled solution. This solid is washed with acetone and thoroughly dried in vacuo to yield the quaternary salt.

The requisite p-methoxybenzylchloride is obtained by treating a benzene solution of anisyl alcohol with anhydrous hydrogen chloride with cooling until the solution is saturated. After stirring for two hours, the aqueous layer is removed and the organic layer stirred for one hour with anhydrous sodium sulfate. The drying agent is then removed by filtration and the solvent and hydrogen chloride are removed by flash evaporation. The product can be used in the above procedure without further purification.

(c) 1,3,5-TRIMETHYL-2-(4-METHOXYBENZYL)-4-PHENYL 1,2,5,6-TETRAHYDROPYRIDINE

An ethereal suspension of 1.05 mole of the quaternary salt obtained in part (b) of this example is treated under nitrogen with 625 ml. (.98 mole) of a 1.56 N ethereal solution of butyl lithium. The butyl lithium is added slowly over a period of one hour, the reaction mixture being stirred during the addition. At the end of this time, the reaction mixture is refluxed for two hours, cooled and poured into one liter of cold water. The ethereal layer is separated and extracted with a solution of 100 ml. of conc. hydrochloric acid in one liter of water. The aqueous extracts together with the oily precipitate are then rendered alkaline by the addition of 200 ml. of conc. aqueous ammonia. The precipitated base is taken up in ether and the solution thus obtained dried over sodium sulfate. The drying agent is removed by filtration and the solvent by evaporation to yield 1,3,5-trimethyl-2-(4 - methoxybenzyl)-4-phenyl-1,2,5,6-tetrahydropyridine which is further purified by distillation.

The distillate is converted to the hydrobromide by the cautious addition of anhydrous hydrogen bromide to a cold acetone solution of the base. Collection of the solid thus formed and recrystallization yields the hydrobromide salt.

A solution of 0.1 mole of 1,3,5-trimethyl-2(4-methoxybenzyl)-4-phenyl-1,2,5,6-tetrahydropyridine in 300 ml. of 48% hydrobromic acid is refluxed for four and one-half hours. At the end of this time, the reaction mixture is cooled and poured into a cold solution of 330 ml. of conc. aqueous ammonia and an equal volume of ice. The solid which forms is collected by filtration and dried to constant weight to yield 1,2,3,4,5,6-hexahydro-6-phenyl-3,5,11-trimethyl-2,6-methano-3-benzazocine-8-ol.

The reflux period in this procedure may be increased to as much as 24 hours without appreciable effect on the yield.

The above free base is converted to the hydrochloride salt by treating an absolute methanol solution of the base with anhydrous hydrogen chloride. The solid which forms upon addition of 4 volumes of anhydrous ether is further recrystallized from methanol-ether.

EXAMPLE 2

6-(p-chlorophenyl)-1,2,3,4,5,6-hexahydro-3,5,11-trimethyl-2,6-methano-3-benzazocine-8-ol (a) 1,3,5-TRIMETHYL-4(p-CHLOROPHENYL)-1,2,5,6-TETRAHYDROPYRIDINE To 298 ml. of 1.68 N butyl lithium in hexane. (Foote Mineral Co.) under an atmosphere of oxygen free nitrogen is cautiously introduced 96.0 g., 0.50 ml. of p-chlorobromobenzene dissolved in 200 ml. of anhydrous ethyl ether. The reaction mixture is cooled to —20° and 1,3,5-trimethyl-4-piperidone in 100 ml. of anhydrous ether was added dropwise over 1.5 hours. The mixture is stirred for an hour at room temperature then quenched with 175 ml. of concentrated hydrochloric acid. The acid phase is refluxed three hours, made basic with 50% sodium hydroxide and extracted with ether. Concentration of the extract yields 1,3,5-trimethyl-4(p-chlorophenyl)-1,2,5,6-tetrahydropyridine.

(b) 1,3,5 - TRIMETHYL - 1 - (4 - METHOXYBENZYL)-4-(p-CHLOROPHENYL) - 1,2,5,6-TETRAHYDROPYRIDINIUM CHLORIDE

The procedure of Example 1(b) is used substituting the product of step (a) herein.

(c) 1,3,5 - TRIMETHYL - 2 - (4-METHOXYBENZYL)-4-(p-CHLOROPHENYL-1,2,5,6-TETRAHYDROPYRIDINE

The procedure of Example 1, step (c) is used with phenyl lithium substituted for butyl lithium.

The product, 6-(p-chlorophenyl)-1,2,3,4,5,6-hexahydro-3,5,11-trimethyl-2,6-methano-3-benzazocine-8-ol is obtained by treating the intermediate of step (c) in accordance with the procedure of Example 1.

EXAMPLE 3

8,9 - dimethoxy - 1,2,3,4,5,6 - hexahydro - 6 - phenyl-3,5,11 - trimethyl - 2,6 - methano - 3 - benzazocine and 8,9 - diol derivative (a) 1,3,5-TRIMETHYL-4-PHENYL-1,2,5,6-TETRAHYDROPYRIDINE This is prepared by the procedure of Example 1, step (a).

(b) 1,3,5 - TRIMETHYL - 4 - PHENYL-1-(3.4-DIMETHOXYBENZYL) - 1,2,5,6 - TETRAHYDROPYRIDINIUM CHLORIDE

The procedure of Example 1, step (b) is used with 3,4-dimethoxybenzylchloride as the quaternizing agent. The latter is prepared similarly to p-methoxybenzyl chloride.

(c) 1,3,5 - TRIMETHYL - 2 - (3,4 - DIMETHOXYBENZYL)-4-PHENYL-1,2,5,6-TETRAHYDROPYRIDINE

The procedure of Example 1, step (c) as modified in Example 2, step (c) is used to prepare this compound from the product of step (b), this example.

(d) 3,5,11 - TRIMETHYL - 6 - PHENYL - 8,9 - DIHYDROXY-1,2,3,4,5-HEXAHYDRO-2,6-METHANO-3-BENZAZOCINE

Cyclization and cleavage of the methoxyl groups with a stoichiometrically equivalent amount of 48% HBr are carried out in accordance with the procedure of Example 1, final step.

(e) 8,9 - DIMETHOXY - 1,2,3,4,5,6 - HEXAHYDRO - 6-PHENYL - 3,5 - 11 - TRIMETHYL - 2,6 - METHANO - 3-BENZAZOCINE

To a suspension of 5.0 g. of the diol of step (d) in 50 ml. of a 1:1 chloroform:methanol mixture is added to 100 ml. of freshly prepared diazomethane ethereal solution. The mixture is stirred at room temperature for 6 hours and then evaporated to dryness in vacuo. The residue is treated with 500 ml. of ether and 500 ml. of 1 N hydrochloric acid. The acidic layer is rendered alkaline with concentrated ammonia and extracted twice with ether. The ethereal extracts are washed with water, dried over anhydrous sodium sulfate and evaporated to dryness. The oily residue is dissolved in 40 ml. of 0.5 N hydrochloric acid with heating and the solution then cooled. The solid which forms is collected, dried and recrystallized from water to yield the product.

EXAMPLE 4

1,2,3,4,5,6-hexahydro-6-(5'-bromo - 2' - methoxyphenyl)-3,5,11-trimethyl-2,6-methano-3-benzazocine and its mono-ol derivative (a) 1,3,5-TRIMETHYL-4-(2-METHOXY-5-BROMOPHENYL)-1,2,5,6-TETRAHYDROPYRIDINE To a solution of p-bromoanisole (0.5 mole) in 400 ml. of ether is added 313 ml. of 1.6 N butyl lithium. After 15 minutes at reflux, there is added 400 ml. benzene and refluxing is continued for 16 hours. The reaction mixture is cooled to —20° and 0.45 mole of 1,3,5-trimethyl-4-piperidone in 100 ml. of ether was added during 40 minutes. Stirring is continued for ½ hour at —20° and then the mixture is allowed to warm slowly to room temperature, whereupon 250 ml. of 10% hydrochloric acid is added. The acid phase is made basic and extracted with 300 ml. of chloroform. The dried chloroform extract on evaporation yields 1,3,5-trimethyl-4-(2-methoxy-5-bromophenyl)-4-hydroxypiperidine. One-tenth mole of the above alcohol is treated with 200 ml. of concentrated hydrochloric acid at reflux for 3 hours; the mixture is made basic with 50% sodium hydroxide and extracted with ether. Concentration of the extract yields 1,3,5-trimethyl-4-(2-methoxy-5-bromophenyl) - 1,2,5,6 - tetrahydropyridine.

(b) 1,3,5 - TRIMETHYL - 1 - BENZYL - 4 - (2 - METHOXY-5-BROMOPHENYL-1,2,5,6-TETRAHYDROPYRIDINE

The procedure of Example 1, step (b), is used with the compound of step (a) herein and benzyl chloride as the quaternizing agent.

(c) 1,3,5 - TRIMETHYL - 2 - BENZYL - 4 - (2 - METHOXY-5-BROMOPHENYL)-1,2,5,6-TETRAHYDROPYRIDINE

The procedure of Example 2, step (c), is used with the product of step (b) herein.

(d) 1,2,3,4,5,6 - HEXAHYDRO - 6 - (5' - BROMO - 2' - HYDROPHENYL) - 3,5,11 - TRIMETHYL - 2,6 - METHANO-3 - BENZAZOCINE

Cyclization and cleavage with 48% HBr are carried out in accordance with the procedure of Example 1, final step.

This compound is converted to 1,2,3,4,5,6-hexahydro-6-(5''-bromo - 2' - methoxyphenyl)-3,5,11-trimethyl-2,6-methano-3-benzazocine with diazomethane in accordance with Example 3, step (e).

EXAMPLE 5

8-acetoxy-1,2,3,4,5,6-hexahydro-6-phenyl-3,5,11-trimethyl-2,6-methano-3-benzazocine A mixture of 1.68 g. of the 1,2,3,4,5,6-hexahydro-6-phenyl-3,5,11-trimethyl-2,6-methano - 3 - benzazocine-8-ol of Example 1 and 8.4 ml. of acetic anhydride is heated at 100° C. for 45 minutes. The solution is then poured into 20 ml. of cold water and after 5 minutes, an aqueous solution of 50% potassium hydroxide is added in slight excess with cooling. The liberated base is shaken quickly into ether. Drying and evaporation of the ethereal solution followed by recrystallization from isopropyl ether affords the desired product.

The free base may be converted to the hydrochloride by dissolving it in a minimum volume of absolute ethanol and treating the solution with ethanolic hydrogen chloride until acidic to Congo red indicator. The solution is then diluted with 5 volumes of anhydrous ether and allowed to crystallize. There is obtained the hydrochloride salt upon filtration.

In a similar fashion by employing acylating derivatives of other (lower) alkanoic acids the corresponding alkanoyloxy compounds can be obtained. For example, by use of propionyl chloride in the above procedure there is obtained 8-propionoxyloxy-1,2,3,4,5,6-hexahydro-6-phenyl-3,5,11-trimethyl-2,6-methano-3-benzazocine.

EXAMPLE 6

1,2,3,4,5,6-hexahydro-8-methoxy-6-phenyl-3,5,11-trimethyl-2,6-methano-3-benzazocine The 1,2,3,4,5,6-hexahydro-6-phenyl-3,5,11-trimethyl-2,6-methano-3-benzazocine-8-ol of Example 1 is converted with diazomethane according to step (e) of Example 3 to the product, 1,2,3,4,5,6-hexahydro-8-methoxy-6-phenyl-3,5,11-trimethyl-2,6-methano-3-benzazocine.

EXAMPLE 7

5,11-dimethyl-1,2,3,4,5,6-hexahydro-6-phenyl-2,6-methano-3-benzazocine-8-ol (a) 8 - ACETOXY - 3 - CYANO - 5,11 - DIMETHYL - 1,2,3,4,5,6 - HEXAHYDRO - 6 - PHENYL - 2,6 - METHANO - 3 - BENZAZOCINE To a solution of 2.59 g. (24.4 mmole) of cyanogen bromide in 30 ml. of chloroform is added 6.53 g. of 8-acetoxy - 1,2,3,4,5,6 - hexahydro - 6 - phenyl-3,5,11-trimethyl-2,6-methano-3-benzazocine (prepared as described in Example 5) as the free base. The addition is executed over a 45 minute period at room temperature. The reaction solution is refluxed for three hours and then concentrated in vacuo. The resulting solid is crystallized from acetone until the melting point is constant.

(b) 5,11-DIMETHYL-1,2,3,4,5,6-HEXAHYDRO-6-PHENYL-2,6-METHANO-3-BENZAZOCINE-8-OL

To a suspension of 5.60 g. of lithium aluminum hydride in 100 ml. of dry tetrahydrofuran under anhydrous conditions are added 5.00 g. of the compound of step (a) dissolved with the aid of heat in 100 ml. of dry tetrahydrofuran. The mixture is refluxed for 17 hours and then decomposed by the addition of 29 ml. of saturated sodium chloride solution. The resulting solution is next refluxed an hour and filtered. The filtrate is concentrated in vacuo and the residue is then recrystallized from isopropanol to yield the product.

EXAMPLE 8

5,11-dimethyl-1,2,3,4,5,6-hexahydro-3-$\beta$-phenethyl-6-phenyl-2,6-methano-2-benzazocine-8-ol To a suspension of 1.10 g. of 5,11-dimethyl-1,2,3,4,5,6-hexahydro-6-phenyl-2,6-methano-3-benzazocine - 8 - ol, prepared as described in Example 7, and 0.80 g. of sodium bicarbonate in 20 ml. of dimethyl formamide, is added 0.87 g. of $\beta$-phenethyl bromide in 5 ml. of dimethyl formamide dropwise with stirring at room temperature. The reaction mixture is stirred at reflux for 4 hours and then brought to dryness under reduced pressure. The residue is treated with aqueous ammonia and chloroform. The chloroform layer is separated, washed with water, dried over anhydrous sodium sulfate and evaporated to yield the product as a free base.

The free base is dissolved in 10 ml. of isopropanol and 1.6 ml. of ethanolic hydrogen chloride (2.52 N) is added to the solution. The solid which forms is collected and dried to yield the product in the form of its hydrochloric acid addition salt.

EXAMPLE 9

3-(p-aminophenethyl)-5,11-dimethyl-1,2,3,4,5,6-hexahydro-6-phenyl-2,6-methano-3-benzazocine-8-ol A mixture of 12 g. of 5,11-dimethyl-1,2,3,4,5,6-hexahydro-6-phenyl-2,6-methano-3-benzazocine - 8 - ol (Example 7), 12 g. of 2-(4-nitrophenyl) ethyl bromide and 8 g. of potassium carbonate in 180 ml. of dimethyl formamide is stirred at 95–99° C. for six hours. The cooled mixture is evaporated and triturated with water and is poured into 1 l. of water and extracted into ethyl acetate. Evaporation of the extract yields 3-(p-nitrophenethyl)-5,11 - dimethyl - 1,2,3,4,5,6 - hexahydro-6-phenyl-2,6-methano-3-benzazocine-8-ol.

A suspension of 4.5 g. of the nitro-substituted benzazocine and 3 g. of 10% palladium on charcoal in 200 ml. of ethanol is hydrogenated in a Parr apparatus under a pressure of 40 lbs./in. When the theoretical amount of hydrogen is absorbed, the catalyst is removed by filtration and the filtrate evaporated to dryness. The product remains as a residue.

EXAMPLE 10

5,11-dimethyl-1,2,3,4,5,6-hexahydro-3-(3-methyl-2-butenyl)-6-phenyl-2,6-methano-3-benzazocine-8-ol A mixture of 8.7 g. of 5,11-dimethyl-1,2,3,4,5,6-hexahydro - 6 - phenyl-2,6-methano-3-benzazocine-8-ol (Example 7), 6.0 g. of 1-bromo-3-methyl-2-butene, 5.0 g. of sodium bicarbonate and 125 ml. of dimethyl formamide is heated at reflux with stirring for four hours. The solvent is then removed in vacuo and the residue taken up in water and chloroform. The aqueous layer is separated and the chloroform solution is extracted several times with dilute aqueous hydrochloric acid. The acidic extracts are clarified, filtered and rendered alkaline by the addition of aqueous ammonia. The solid which thus forms is taken up in chloroform and this chloroform solution is dried over sodium sulfate and evaporated. The residue is recrystallized from methanol to yield the product.

EXAMPLE 11

3-allyl-5,11-dimethyl-1,2,3,4,5,6-hexahydro-6-phenyl-2,6-methano-3-benzazocine-8-ol Two grams of 5,11-dimethyl-1,2,3,4,5,6-hexahydro-6-phenyl-2,6-methano-3-benzazocine-8-ol (Example 7), 1.2 g. of sodium bicarbonate and 1.12 g. of allyl bromide in 50 ml. of absolute ethanol is heated at reflux with stirring for eight hours. The solvent is then removed in vacuo. The residue is purified in accordance with the procedure of Example 10. The product is purified by recrystallization from methanol.

EXAMPLE 12

2-(3-chloro-2-propenyl)-5,11-dimethyl-1,2,3,4,5,6-hexahydro-6-phenyl-2,6-methano-3-benzazocine-8-ol A mixture of 8.7 g. of 5,11-dimethyl-1,2,3,4,5,6-hexahydro-6-phenyl - 2,6 - methano-3-benzazocine-8-ol (Example 7), 4.4 g. of cis-1,3-dichloro-1-propene, 3.0 g. of sodium bicarbonate and 125 ml. of dimethyl formamide is stirred at reflux for five hours. The solvent then is removed in vacuo. The residue is triturated with 100 ml. of chloroform and 50 ml. of water. The chloroform layer is washed with 20 ml. of water, dried over anhydrous sodium sulfate and evaporated to dryness. The residue is then recrystallized from absolute ethanol to yield the product.

In a similar fashion by use of 1,3,3-trichloro-2-propene;
1,3-dichloro-2-butene;
1,2-dibromo-2-propene;
1,4-dibromo-2-butene;
1,1,3-tribromo-1-propene;
1,3-dibromo-1-propene;
1,2,3-trichloro-1-propene;
1,2-dichloro-2-propene, and
1,1,2,3-tetrachloro-1-propene there are obtained 3-(3,3-dichloro-2-propenyl)-5,11-dimethyl-1,2,3,4,5,6-hexahydro-6-phenyl-2,6-methano-3-benzazocine-8-ol;
3-(3-chloro-2-butenyl)-5,11-dimethyl-1,2,3,4,5,6-hexahydro-6-phenyl-2,6-methano-3-benzazocine-8-ol;
3-(2-bromo-2-propenyl)-5,11-dimethyl-1,2,3,4,5,6-hexahydro-6-phenyl-2,6-methano-3-benzazocine-8-ol;
3-(4-bromo-2-butenyl)-5,11-dimethyl-1,2,3,4,5,6-hexahydro-6-phenyl-2,6-methano-3-benzazocine-8-ol;
3-(3,3-dibromo-2-propenyl)-5,11-dimethyl-1,2,3,4,5,6-hexahydro-6-phenyl-2,6-methano-3-benzazocine-8-ol;
3-(3-bromo-2-propenyl)-5,11-dimethyl-1,2,3,4,5,6-hexahydro-6-phenyl-2,6-methano-3-benzazocine-8-ol;
3-(2,3-dichloro-2-propenyl)-5,11-dimethyl-1,2,3,4,5,6-hexahydro-6-phenyl-2,6-methano-3-benzazocine 8-ol;
3-(2-chloro-2-propenyl)-5,11-dimethyl-1,2,3,4,5,6-hexahydro-3-benzazocine-8-ol; and
3-(2,3,3-trichloro-2-propenyl)-5,11-dimethyl-1,2,3,4,5,6-hexahydro-6-phenyl-2,6-methano-3-benzazocine-8-ol.

In a similar fashion, by using trans-1,3-dichloro-1-propene there is obtained trans-3-(3-chloro-2-propenyl)-5,11-dimethyl-1,2,3,4,5,6-hexahydro - 6 - phenyl-2,6-methano-3-benzazocine-8-ol.

EXAMPLE 13

3-cyclopropylmethyl-5,11-dimethyl-1,2,3,4,5,6-hexahydro-6-phenyl-2,6-methano-3-benzazocine-8-ol To a solution of 5,11-dimethyl-1,2,3,4,5,6-hexahydro-6-phenyl-2,6-methano-3-benzazocine-8-ol (5.31 g.) in 100 ml. of pyridine, are added with stirring 5.02 g. of cyclopropane carboxylic acid chloride in 10 ml. of toluene through a dropping funnel. The mixture is stirred at reflux for 2½ hours and then evaporated to dryness. The residue is triturated with 100 ml. of 1 N hydrochloric acid and 150 ml. of chloroform. The chloroform layer is washed with water, clarified with charcoal, dried over anhydrous sodium sulfate and brought to dryness. The residue is dissolved in 50 ml. of tetrahydrofuran and added to a suspension of 3.0 g. of lithium aluminum hydride in 50 ml. of tetrahydrofuran with stirring over the period of 15 minutes. The reaction mixture is stirred at reflux for 15 hours. The excess of lithium aluminum hydride is then decomposed by the addition of 30 ml. of ethyl acetate followed by 50 ml. of water. About 100 g. of anhydrous sodium sulfate is then added to the mixture with heating and stirring to obtain a granular precipitate. The precipitate is collected by filtration and washed three times with 20 ml. portions of hot tetrahydrofuran. The filtrate is combined with the washings and evaporated to dryness. The residue next is treated with 50 ml. of aqueous ammonium hydroxide and chloroform. The chloroform layer is separated, washed with water, dried over anhydrous sodium sulfate evaporated to dryness. The residue is crystallized from chloroform to yield the desired product.

EXAMPLE 14

Resolution of 1,2,3,4,5,6-hexahydro-6-phenyl-3,5,11-trimethyl-2,6-methano-3-benzazocine-8-ol A solution of 43.94 g. of dl-1,2,3,4,5,6-hexahydro-6-phenyl-3,5,11-trimethyl-2,6-methano - 3 - benzazocine-8-ol (Example 1) and 24.04 g. of d-mandelic acid in 1250 ml. of methanol and 500 ml. of isopropanol is concentrated to a volume of approximately 700 ml. The mixture then is cooled and the diastereometric mandelic acid salt is separated from the mother liquor and dried. This salt is partially dissolved in 250 ml. of boiling water and 75 ml. of 5% aqueous ammonium hydroxide is added. Upon cooling, the solid is collected and recrystallized from n-butanol to give 1-1,2,3,4,5,6-hexahydro - 6-phenyl-3,5,11-trimethyl-2,6-methano-3-benzazocine-8-ol.

The above obtained mother liquor is evaporated to dryness and the residue partially dissolved in 300 ml. of boiling water. To this is added 150 ml. of 5% aqueous ammonium hydroxide. The solid which forms on cooling (about 25 g.) is added to 13.70 g. of l-mandelic acid in 1250 ml. of methanol and 500 ml. of isopropanol and this solution is then concentrated to a volume of approximately 700 ml. The solid which forms upon cooling is collected and dried and dissolved in 400 ml. of boiling water. One hundred milliliters of 5% aqueous ammonia then is added. The solid formed is collected and recrystallized from n-butanol to give d-1,2,3,4,5,6-hexahydro-6-phenyl-3,5,11-trimethyl - 2,6-methano-3-benzazocine-8-ol.

The hydrochloric acid addition salt of each of the above d and l forms is prepared by treating a hot solution of the free base in n-butanol with ethanolic hydrogen chloride.

EXAMPLE 15 d-1,2,3,4,5,6-hexahydro-8-methoxy-6-phenyl-3,5,11-trimethyl-2,6-methano-3-benzazocine The d-1,2,3,4,5,6-hexahydro-6-phenyl-3,5,11-trimethyl-2,6-methano-3-benzazocine-8-ol, prepared as described in Example 14, is treated with diazomethane by the procedure of Example 3, step (e), and the product d-1,2,3,4,5,6-hexahydro-8-methoxy - 6 - phenyl-3,5,11-trimethyl-2,6-methano-3-benzazocine, is obtained in good yield.

EXAMPLE 16

1-5,11-dimethyl-1,2,3,4,5,6-hexahydro-3-(β-phenethyl)-6-phenyl-2,6-methano-3-benzazocine-8-ol A mixture of 2.50 g. of 1-5,11-dimethyl-1,2,3,4,5,6-hexahydro - 6 - phenyl - 2,6 - methano - 3 - benzazocine-8-ol, 0.99 g. of sodium bicarbonate, 2.18 g. of p-phenethyl bromide and 50 ml. of dimethyl formamide is refluxed for four hours and stirred overnight at room temperature. The suspension is cooled in an ice bath and the product was collected and washed with water, then dried.

The free base, 2.8 g. in 100 ml. of boiling methanol is treated with 3.2 ml. of 2.4 N ethanolic hydrochloric acid. Addition of 200 ml. of ether to the solution causes slow crystallization of the hydrochloric acid addition salt of the product. This is recovered by filtration.

EXAMPLE 17

1,2,3,4,5,6-hexahydro-3-methyl-6-phenyl-2,6-methano-3-benzazocine-1-one (a) 2-BROMO-4-DIMETHYLAMINOETHYL-4-PHENYL-1-TETRALONE HYDROBROMIDE To a hot solution of 40 g. (0.135 mole) of 4-dimethylaminoethyl-4-phenyl-1-tetralone in 100 ml. of acetic acid is added slowly a solution of 7 ml. (21.8 g., 0.14 mole) of bromine in 20 ml. of acetic acid. The solution is stirred and heated just below the boiling point for 35 minutes, and allowed to cool to room temperature. A dark yellow solid separates. The solid is recovered by filtration and washed with ethanol. The resulting pale yellow solid weighs 30 g. (49%).

(b) 1,2,3,4,5,6-HEXAHYDRO-3-METHYL-6-PHENYL-2,6-METHANO-3-BENZAZOCINE-1-ONE

A mixture of 30 g. (0.066 mole) of 2-bromo-4-dimethylaminoethyl - 4 - phenyl-1-tetralone hydrobromide, 200 ml. of water, 50 ml. of methanol and 5 ml. (approximately 0.074 mole) of concentrated ammonium hydroxide is stirred at room temperature. After three hours, a further 3 ml. (approximately 0.042 mole) of ammonimum hydroxide is added and enough methanol to dissolve most of the solid. Stirring is continued overnight. The resulting clear solution is evaporated to give 28 g. (estimated 90%) of pale yellow solid. To the solid is added 200 g. of nonanol, and the mixture is refluxed until all the solid dissolves, and for 30 minutes more. There is collected 8 ml. of water with a Dean-Stark trap; this is presumed to have been present in the quaternary salt. The solution is diluted with ether, and the mixture is extracted with water. The organic solution is extracted three times with N/1 hydrochloric acid, and the acidic solution is extracted twice with ether and neutralized with 6 N sodium hydroxide. The basic solution is extracted twice with ether, and the ethereal solution is dried over sodium sulfate and evaporated, to give 9.3 g. (66%, corrected for ammonium bromide and water) of pale yellow solid. After recrystallization from methanol-ether-hexane, the solid melts at 131–132°.

EXAMPLE 18

1,3-dimethyl-1,2,3,4,5,6-hexahydro-6-phenyl-2,6-methano-3-benzazocine-1-ol

To an ethereal solution of 7 mmoles of methyl magnesium bromide was added an ethereal solution of 1.39 g. (5 mmoles) of 1,2,3,4,5,6-hexahydro-3-methyl-6-phenyl-2,6-methano-3-benzazocine-1-one (Example 17). The yellow color of the ketone fades and the reaction mixture gradually becomes cloudy. After one hour saturated ammonium chloride solution is added, and the solution is extracted with ether. The base is precipitated from the ethereal solution as the hydrochloride. The white solid (1.3 g., 80%) melts at 269–269.5° C. after recrystallization from methanol-ether.

EXAMPLE 19

5,11-dimethyl-1,2,3,4,5,6-hexahydro-3-pentyl-6-phenyl-2,6-methano-3-benzazocine-8-ol The compound of Example 7, 5,11-dimethyl-1,2,3,4, 5,6 - hexahydro-6-phenyl-2,6-methano-3-benzazocine-8-ol (2.00 g.), 50 ml. of dimethyl formamide, 0.76 g. of sodium bicarbonate and 1.74 g. of pentyl bromide are heated at an oil bath temperature of 145° C. for 4 hours and then stirred overnight at room temperature. The mixture is concentrated in vacuo and the residue washed with 100 ml. of water and dried to yield the desired product as the free base.

This product is converted to the hydrochloric acid addition salt with 2.4 N ethanolic hydrogen chloride.

EXAMPLE 20

3,4-dimethyl-1,2,3,4,5,6-hexahydro-6-phenyl-2,6-methano-3-benzazocine (a) 2-DIMETHYLAMINOPROPYLCHLORIDE HYDROCHLORIDE To a solution of 15 ml. of thionyl chloride in 100 ml. of chloroform kept at 0° is added a solution of 2-dimethylaminopropanol in 40 ml. of chloroform. The solution is refluxed for two hours and the solvent is evaporated. The resulting solid hydrochloride is used without further purification.

(b) 4-β-DIMETHYLAMINOPROPYL-4-PHENYL-1-TETRALONE

The above salt is used to alkylate 19.45 g. of 4-phenyl-1-tetralone. There is obtained 11.9 g. (44%) of a yellow-brown oil.

(c) 3,4-DIMETHYL-1,2,3,4,5,6-HEXAHYDRO-6-PHENYL-2,6-METHANO-3-BENZAZOCINE-1-ONE METHOBROMIDE

To a stirred, heated solution of 11.9 g. (.0388 mole) of 4-β-dimethylaminopropyl-4-phenyl-1-tetralone in acetic acid is added 2.2 ml. (0.042 mole) of bromine in acetic acid. After 30 min. the solution is cooled and poured into 1 liter of ether. The resulting tan solid (18.6 g.) is dissolved in methanol and ammonium hydroxide, and the solution is stirrred overnight. The solvent is evaporated to give 18.8 g. of pale tan solid.

(d) 3,4-DIMETHYL-1,2,3,4,5,6-HEXAHYDRO-6-PHENYL-2,6-METHANO-3-BENZAZOCINE-1-ONE

A solution of the above methobromide in 150 ml. of nonanol is refluxed for 1 hr. The solution is cooled and diluted to 1500 ml. with ether, and the solution is washed with saturated sodium chloride solution and extracted twice with N/1 hydrochloric acid. The acidic solution is made basic with N/1 sodium hydroxide and extracted with ether. The ethereal extract is dried over sodium-sulfate and evaporated, to give 6.43 g. (57% overall from 4-dimethylaminopropyl - 4 - phenyltetralone) of yellow solid melting at 197–198°.

(e) 3,4-DIMETHYL-1,2,3,4,5,6-HEXAHYDRO-6-PHENYL-2,6-METHANO-3-BENZAZOCINE

A mixture of the above ketone, 2 g. of powdered potassium hydroxide, 2 ml. of hydrazine hydrate and 50 ml. of diethylene glycol is stirred and heated at 180–185° for three hours. The resulting pale yellow solution is diluted with water and extracted with ether. The ethereal solution is washed with saturated salt solution, dried over sodium sulfate and concentrated. The residue is redissolved in ether and hydrogen bromide is passed into the solution. The solid hydrobromide was dried in a vacuum oven, to give 0.73 g. (29%) of tan solid. After recrystallization from ethanol-ether, the pale cream-colored salt weighs 0.26 g.

EXAMPLE 21

1,2,3,4,5,6-hexahydro-1-methylene-3-methyl-6-phenyl-2,6-methano-3-benzazocine

A solution of 2 g. of 1,3-dimethyl-1,2,3,4,5,6-hexahydro-6-phenyl-2,6-methano-3-benzazocine-1-ol and 2 ml.

of thionyl chloride in 50 ml. of pyridine is stirred at room temperature for 48 hours. Evaporation of the solvent yields 2.0 g. of the desired product.

EXAMPLE 22

1,3-dimethyl-1,2,3,4,5,6-hexahydro-6-phenyl-2,6-methano-3-benzazocine

Two grams of 1,2,3,4,5,6 - hexahydro - 1 - methylene-3 - methyl - 6 - phenyl - 2,6 - methano - 3 - benzazocine dissolved in 100 ml. of ethanol and 2 ml. of hydrochloric acid is hydrogenated in the presence of 100 mg. of platinum oxide catalyst. After hydrogen uptake ceases, the solution is filtered and evaporated and the residue is recrystallized from ethanol-ether to give white needles melting at 254–255°, with decomposition.

EXAMPLE 23

1-ethyl-1,2,3,4,5,6-hexahydro-3-methyl-6-phenyl-2,6-methano-3-benzazocine-1-ol

To an ethereal solution of 7 mmole of ethyl-magnesium bromide is added an ethereal solution of 1,2,3,4,5,6-hexahydro - 3 - methyl - 6 - phenyl - 2,6 - methano-3-benzazocine-1-one. The solution is stirred for 1 hour and saturated ammonium chloride solution is added. The ether layer is separated and the product is precipitated and recovered in the form of its hydrochloric acid addition salt.

EXAMPLE 24

2,3-dimethyl-1,2,3,4,5,6-hexahydro-6-phenyl-2,6-methano-3-benzazocine and 8-ol (a) 4,4-DIPHENYL-2-METHYLBUTYRIC ACID To a solution of 0.2 mole of potassium diphenyl-methide in 300 ml. of liquid ammonia is added an ethereal solution of 16.7 g. (0.1 mole) of 2-methyl-3-bromopropionic acid. The mixture is stirred for 30 minutes, the ammonia is evaporated, and the residue is dissolved in water and extracted with ether. The aqueous solution is acidified with hydrochloric acid, and the resulting white solid is collected and dried.

(b) 2-METHYL-4-PHENYL-1-TETRALONE

The above acid is added to 300 ml. of polyphosphoric acid, heated to 130°. After 90 minutes the brown solution is poured onto ice, and the tan solid is collected by filtration.

(c) 2-METHYL-4-PHENYL-4-DIMETHYLAMINOETHYL-1-TETRALONE

To a solution of 0.02 mole of potassium amide in 200 ml. of liquid ammonia is added 2.36 g. (0.01 mole) of the above tetralone. The resulting deep red solution is stirred for 20 minutes, and an ethereal solution of dimethylaminoethyl chloride, prepared from 2.5 g. of the hydrochloride, is added. After 20 minutes the green solution is neutralized with ammonium chloride, and the ammonia is evaporated. The residue is extracted with ether, the ethereal solution is extracted with N/1 hydrochloric acid, the acidic solution is neutralized with N/1 sodium hydroxide, and the basic solution is extracted with ether. The ethereal solution is dried over sodium sulfate and evaporated.

(d) 2,3 - 1,2,3,4,5,6 - HEXAHYDRO - 6 - PHENYL - 2,6-METHANO-3-BENZAZOCINE-1-ONE METHOBROMIDE

To a solution of 3.07 g. (0.01 mole) of the above amine in 75 ml. of glacial acetic acid, heated to 100°, is added 1.6 g. of bromine in 20 ml. of acetic acid. The solution is heated for 30 minutes cooled to room temperature and poured into 350 ml. of ether. The tan solid is collected and dissolved in 50 ml. of methanol, and 2 ml. of ammonium hydroxide is added. The solution is stirred overnight and evaporated, to give a yellow solid.

(e) 2,3-DIMETHYL-1,2,3,4,5,6-HEXAHYDRO-6-PHENYL-2,6-METHANO-3-BENZAZOCINE-1-ONE

A solution of 3.89 g. (0.01 mole) of the above methobromide in 75 ml. of nonanol is heated under reflux for 3 hours. The solution is cooled to room temperature, poured into 200 ml. of ether, and extracted with 0.1 N hydrochloric acid. The acidic solution is made basic and extracted with ether. Evaporation of the ether gives a yellow solid.

(f) 2,3-DIMETHYL-1,2,3,4,5,6-HEXAHYDRO-6-PHENYL-2,6-METHANO-3-BENZAZOCINE

A mixture of 1 g. of the above ketone, 2 ml. of hydrazine hydrate, 2 g. of potassium hydroxide and 50 ml. of diethylene glycol is heated to 200° for 3 hours. The solution is poured into water and the aqueous solution extracted with ether. The ethereal extract is dried over sodium sulfate, and hydrogen chloride is bubbled into the solution until precipitation is complete. The hydrochloride is recrystallized from a mixture of ether and ethanol.

The procedure is repeated substituting for 2-methyl-4-phenyl-1-tetralone a stoichiometrically equivalent amount of 6-hydroxy - 2 - methyl - 4 - phenyl-1-tetralone. There is obtained 2,3 - dimethyl - 1,2,3,4,5,6 - hexahydro-6-phenyl-2,6-methano-3-benzazocine-8-ol.

EXAMPLE 25

3,5-dimethyl-1,2,3,4,5,6-hexahydro-6-phenyl-2,6-methano-3-benzazocine (a) 4-DIMETHYLAMINOPROPYL-4-PHENYL-1-TETRALONE To a liquid ammonia solution of 0.2 mole of potassium amide is added 22.2 g. (0.1 mole) of 4-phenyl-1-tetralone then an ethereal solution of 0.1 mole of dimethylaminoisopropyl chloride is added. After stirring for 1 hour, ammonium chloride is added and the ammonia is evaporated. The basic material is extracted with 1 N HCl, bassified with 6 N NaOH, extracted with ether, dried over sodium sulfate, and evaporated. There is obtained 10.8 g. of base.

(b) 3,5-DIMETHYL-1,2,3,4,5,6-HEXAHYDRO-6-PHENYL-2,6-METHANO-3-BENZAZOCINE-1-METHOBROMIDE

To a solution of 10.8 g. of the compound of step (a) in 100 ml. of hot acetic acid is added a solution of 1.9 ml. of bromine in 15 ml. of acetic acid. After cooling, the solution is poured into a large excess of ether. The solid which separates is dissolved in methanol and stirred with 7 ml. of conc. ammonium hydroxide for 18 hours. Evaporation of the solvents leaves the product as a residue.

(c) 3,5-DIMETHYL-1,2,3,4,5,6-HEXAHYDRO-6-PHENYL-2,6-METHANO-3-BENZAZOCINE-1-ONE

The residual solid from step (b) is refluxed in nonanol for 3 hours. After cooling, the solution is diluted with ether and basic material is extracted with 1 N HCl, basified with 6 N NaOH, extracted with ether, dried over sodium sulfate and evaporated. Yield of the desired base: 1.9 g. The hydrochloride is prepared by dissolving the base in ether and treating it with anhydrous hydrogen chloride. Yield of solid: 1.71 g. The acid addition salt is purified by recrystallization from aceton-ethanol.

(d) 3,5-DIMETHYL-1,2,3,4,5,6-HEXAHYDRO-6-PHENYL-2,6-METHANO-3-BENZAZOCINE

In a 100 ml. flask is stirred 50 ml. of diethylene glycol, 1.5 g. of powdered KOH, 1.56 g. of the hydrochloric acid addition salt of step (c) and 1.0 ml. of hydrazine hydrate. The solution is refluxed gently, while stirring, for 3 hours. Water and ether are added to the cooled mixture and the basic material is extracted into ether, dried over sodium sulfate and evaporated. Yield of product: 1.0 g. (75%). The oil is dissolved in ether and treated with anhydrous hydrogen chloride. A yellow solid separates. This is washed in ether and dried in a vacuum desiccator. Yield of the hydrochloric acid addition salt is 1.19 g.

What is claimed is:

1. 1,2,3,4,5,6-hexahydro - 3-methyl-6-phenyl-2,6-methano-3-benzazocine-1-one.

2. 1,3-dimethyl-1,2,3,4,5,6-hexahydro - 6 - phenyl-2,6-methano-3-benzazocine-1-ol.

3. 1,2,3,4,5,6-hexahydro - 1 - methylene - 3 - methyl-6-phenyl-2,6-methano-3-benzazocine.

4. A compound of the formula:

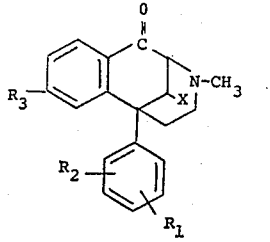

wherein each of $R_1$ and $R_2$ is independently selected from the group consisting of hydrogen, halogen, (lower)alkyl, (lower)alkoxy, (lower)alkanoyloxy, hydroxy and trifluoromethyl;

$R_3$ is selected from the group consisting of hydrogen, hydroxy, halogen, (lower)alkoxy and (lower)alkanoyloxy; and X is selected from the group consisting of hydrogen and methyl.

5. A compound of the formula:

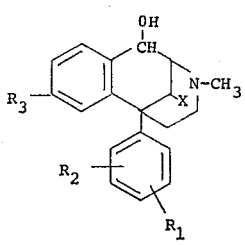

wherein each of $R_1$ and $R_2$ is independently selected from the group consisting of hydrogen, halogen, (lower)alkyl, (lower)alkoxy, (lower)alkanoyloxy, hydroxy and trifluoromethyl;

$R_3$ is selected from the group consisting of hydrogen, hydroxy, halogen, (lower)alkoxy and (lower)alkanoyloxy; and X is selected from the group consisting of hydrogen and methyl.

6. A compound of the formula:

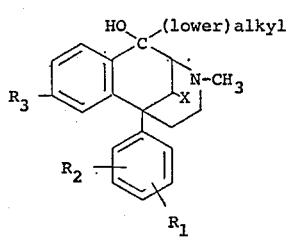

wherein each of $R_1$ and $R_2$ is independently selected from the group consisting of hydrogen, halogen, (lower)alkyl, (lower)alkoxy, (lower)alkanoyloxy, hydroxy and trifluoromethyl;

$R_3$ is selected from the group consisting of hydrogen, hydroxy, halogen, (lower)alkoxy and (lower)alkanoyloxy; and X is selected from the group consisting of hydrogen and methyl.

7. A compound of the formula:

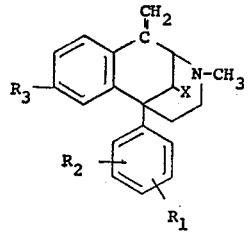

wherein each of $R_1$ and $R_2$ is independently selected from the group consisting of hydrogen, halogen, (lower)alkyl, (lower)alkoxy, (lower)alkanoyloxy, hydroxy and trifluoromethyl;

$R_3$ is selected from the group consisting of hydrogen, hydroxy, halogen, (lower)alkoxy and (lower)alkanoyloxy; and X is selected from the group consisting of hydrogen and methyl.

8. A compound of the formula:

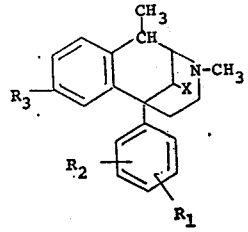

wherein each of $R_1$ and $R_2$ is independently selected from the group consisting of hydrogen, halogen, (lower)alkyl, (lower)alkoxy, (lower)alkanoyloxy, hydroxy and trifluoromethyl;

$R_3$ is selected from the group consisting of hydrogen, hydroxy, halogen, (lower)alkoxy and (lower)alkanoyloxy; and X is selected from the group consisting of hydrogen and methyl.

References Cited

UNITED STATES PATENTS

| | | | |
|---|---|---|---|
| 3,320,265 | 5/1967 | Clarke | 260—294.7 |
| 3,341,538 | 9/1967 | Block et al. | 260—247.2 |

JOHN D. RANDOLPH, Primary Examiner

U.S. Cl. X.R.

260—240, 247.2, 247.5, 290, 471, 516, 518, 562, 570.5, 583, 586; 424—267